(12) United States Patent
Cruit

(10) Patent No.: US 8,794,369 B1
(45) Date of Patent: Aug. 5, 2014

(54) MOTORCYCLE BRAKE ASSIST SYSTEM

(71) Applicant: Ride-Able, Inc., Sullivan, IL (US)

(72) Inventor: Tyler D. Cruit, Sullivan, IL (US)

(73) Assignee: Ride-Able, Inc., Sullivan, IL (US)

( * ) Notice: Subject to any disclaimer, the term of this patent is extended or adjusted under 35 U.S.C. 154(b) by 0 days.

(21) Appl. No.: 14/070,612

(22) Filed: Nov. 4, 2013

Related U.S. Application Data

(60) Provisional application No. 61/723,784, filed on Nov. 8, 2012.

(51) Int. Cl.
*B60T 11/00* (2006.01)
*B62K 11/00* (2006.01)
*B62L 3/00* (2006.01)
*B62K 23/02* (2006.01)
*F15B 13/04* (2006.01)

(52) U.S. Cl.
CPC . *B62L 3/00* (2013.01); *B62K 11/00* (2013.01); *B62K 23/02* (2013.01); *F15B 13/0401* (2013.01)
USPC ....... 180/219; 188/24.11; 188/344; 303/9.64; 303/9.66; 303/137

(58) Field of Classification Search
USPC ......... 180/219, 220, 227, 230, 231; 188/24.11, 24.14, 344; 280/288.4; 303/9.64, 9.66, 137
See application file for complete search history.

(56) References Cited

U.S. PATENT DOCUMENTS

| | | | | |
|---|---|---|---|---|
| 4,598,954 A | * | 7/1986 | Hayashi | 303/9.61 |
| 5,299,652 A | | 4/1994 | Bevins | |
| 6,131,682 A | * | 10/2000 | Walker | 180/219 |
| 7,395,909 B2 | | 7/2008 | Hutchison | |
| 8,256,323 B2 | | 9/2012 | Vellutini | |

* cited by examiner

*Primary Examiner* — Joseph M Rocca
*Assistant Examiner* — Marc A Scharich
(74) *Attorney, Agent, or Firm* — Philip L. Bateman

(57) ABSTRACT

A standard foot-operated rear brake system on a motorcycle is converted to a hand-operated brake assist system by mounting a pneumatic cylinder in close proximity to the rear brake foot pedal such that, when pressurized, the piston of the pneumatic cylinder extends to depress the rear brake foot pedal. The pneumatic cylinder is controlled by a switch on the handlebar.

6 Claims, 5 Drawing Sheets

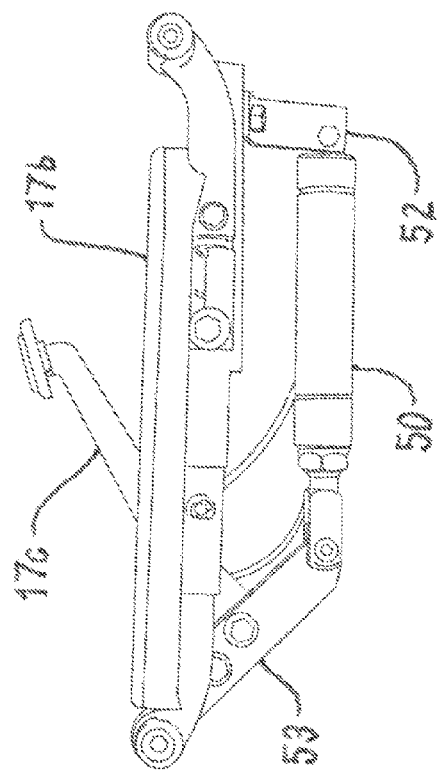
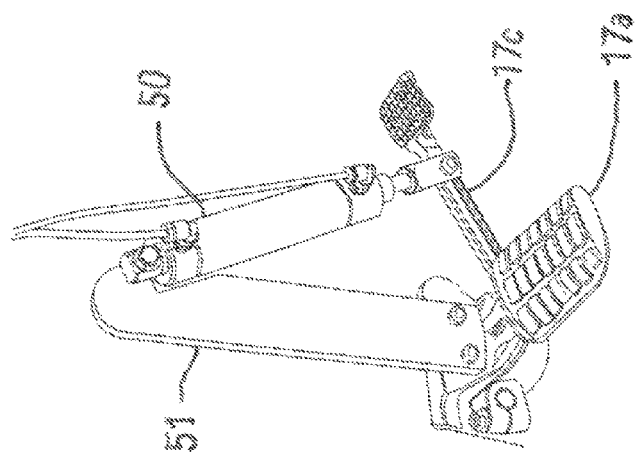
FIG. 6
FIG. 5

MOTORCYCLE BRAKE ASSIST SYSTEM

CROSS-REFERENCE TO RELATED APPLICATION

This application claims the benefit of U.S. Provisional Application Ser. No. 61/723,784, Nov. 8, 2012.

FIELD OF THE INVENTION

This invention relates to motor vehicles. More particularly, this invention relates to motorcycle brakes.

BACKGROUND OF THE INVENTION

Motorcycles are two wheeled motor vehicles. A standard motorcycle having a two cylinder engine in a "V" configuration is shown in FIG. 1. There are about 200 million motorcycles in use worldwide. Operating a standard motorcycle having a manual transmission typically requires both hands and both feet. The left hand is used to operate a clutch lever on the handlebar. The right hand is used to operate both a throttle grip and a front brake lever on the handlebar. The left foot is used to operate a gear shifter lever. The right foot is used to operate a rear brake pedal.

Due to injury, amputation, or other cause, some people are unable to operate a standard manual transmission motorcycle because they lack a right foot capable of operating the rear brake pedal. Various systems with a hand operated control on the handlebar have been disclosed for operating the rear brake. Most involve a replacement of the rear brake pedal and the running of a new hydraulic fluid brake line from the rear brake to the handlebar. Such systems are disclosed in Bevins, U.S. Pat. No. 5,299,652, Apr. 5, 1994; and Hutchison, U.S. Pat. No. 7,395,909, Jul. 8, 2008. While these systems allow the modified motorcycle to be operated without use of the right foot, they tend to be expensive and difficult to install. Furthermore, it is expensive and difficult to restore the motorcycle to normal operation for use by a person with a functioning right foot.

Accordingly, there is a demand for an improved motorcycle having a hand-operated rear brake assist system that works with the standard foot-operated rear brake system. There is also a demand for an improved retrofit system that converts a standard foot-operated rear brake system of a motorcycle to a hand-operated system. There is also a demand for an improved method for converting a standard foot-operated rear brake system of a motorcycle to a hand-operated system.

SUMMARY OF THE INVENTION

One general object of this invention is to provide an improved motorcycle having a hand-operated rear brake assist system that works with the standard foot-operated rear brake system. A second general object is to provide an improved retrofit system that converts a standard foot-operated rear brake system of a motorcycle to a hand-operated system. A third general object is to provide an improved method for converting a standard foot-operated rear brake system of a motorcycle to a hand-operated system.

I have invented an improved motorcycle having a hand-operated rear brake assist system that works with a standard foot-operated rear brake system. The motorcycle comprises: (a) a frame; (b) an engine mounted in the frame; (c) a steering front wheel connected to the frame; (d) a drive rear wheel connected to the frame; (e) a transmission connecting the engine to the rear wheel; (f) a handlebar connected to the front wheel; (g) a rear brake system comprising: (i) a rear brake foot pedal connected to the frame; (ii) a rear brake connected to the rear wheel; and (iii) a hydraulic or mechanical connection between the rear brake foot pedal and the rear brake, the pedal being biased in an upward position in which the rear brake is not applied and such that depression causes the application of the rear brake; and (h) a hand-operated rear brake assist system comprising: (i) an air compressor for producing compressed air; (ii) an air tank for receiving and storing compressed air produced by the air compressor; (iii) a pneumatic cylinder communicating with the air tank, the cylinder mounted on the frame in close proximity to the rear brake foot pedal such that when pressurized its piston extends to depress the rear brake foot pedal and apply the rear brake and when depressurized its piston retracts to allow the rear brake foot pedal to move upward to release the rear brake; (iv) a valve means for controlling air flow between the air tank and the pneumatic cylinder; and (v) a control means for controlling the valve means, the control means comprising a switch mounted on the handlebar.

I have also invented an improved retrofit system that converts a standard foot-operated rear brake system of a motorcycle to a hand-operated rear brake assist system. The retrofit system comprises: (a) an air compressor for producing compressed air; (b) an air tank for receiving and storing compressed air from the air compressor; (c) a pneumatic cylinder adapted for communicating with the air tank, the cylinder adapted for mounting on the frame in close proximity to the rear brake foot pedal such that when pressurized its piston extends to depress the rear brake foot pedal and apply the rear brake and when depressurized its piston retracts to allow the rear brake foot pedal to move upward to release the rear brake; (d) a valve means adapted for controlling air flow between the air tank and the pneumatic cylinder; and (e) a control means adapted for controlling the valve means, the control means comprising a switch adapted for mounting on the handlebar.

I have also invented an improved method for converting a standard foot-operated rear brake system of a motorcycle to a hand-operated rear brake assist system. The method comprises: (a) mounting an air compressor on the motorcycle to produce compressed air; (b) mounting an air tank on the motorcycle for receiving and storing compressed air from the air compressor; (c) mounting a pneumatic cylinder on the motorcycle that communicates with the air tank, the cylinder being mounted on the frame in close proximity to the rear brake foot pedal such that when pressurized its piston extends to depress the rear brake foot pedal and thereby apply the rear brake and when depressurized its piston retracts to allow the rear brake foot pedal to move upward to release the rear brake; (d) mounting a valve means on the motorcycle for controlling air flow between the air tank and the pneumatic cylinder; and (e) mounting a control means for controlling the valve means, the control means including a switch mounted on the handlebar. Activating the switch on the handlebar causes the valve means to open, the pneumatic cylinder and piston to be pressurized, the piston to extend downwardly, the rear brake foot pedal to be depressed, and the rear brake to be applied.

The motorcycle, retrofit system, and method of this invention have important advantages over prior hand-operated rear brake systems for motorcycles. The rear brake system of this invention assists, rather than replaces, the standard foot-operated rear brake system. The system of this invention is relatively inexpensive and easy to install on a motorcycle having a standard rear brake foot pedal. Furthermore, the restoration of the motorcycle to normal operation for use by a person with a functioning right foot is inexpensive and easy because the standard foot-operated rear brake system remains intact.

BRIEF DESCRIPTION OF THE DRAWINGS

FIG. 5 is a perspective view of a vertically-mounted pneumatic cylinder and the rear brake pedal.

FIG. 6 is a perspective view of a horizontally-mounted pneumatic cylinder and the rear brake pedal.

DETAILED DESCRIPTION OF THE INVENTION

1. The Invention in General

Figure 1:
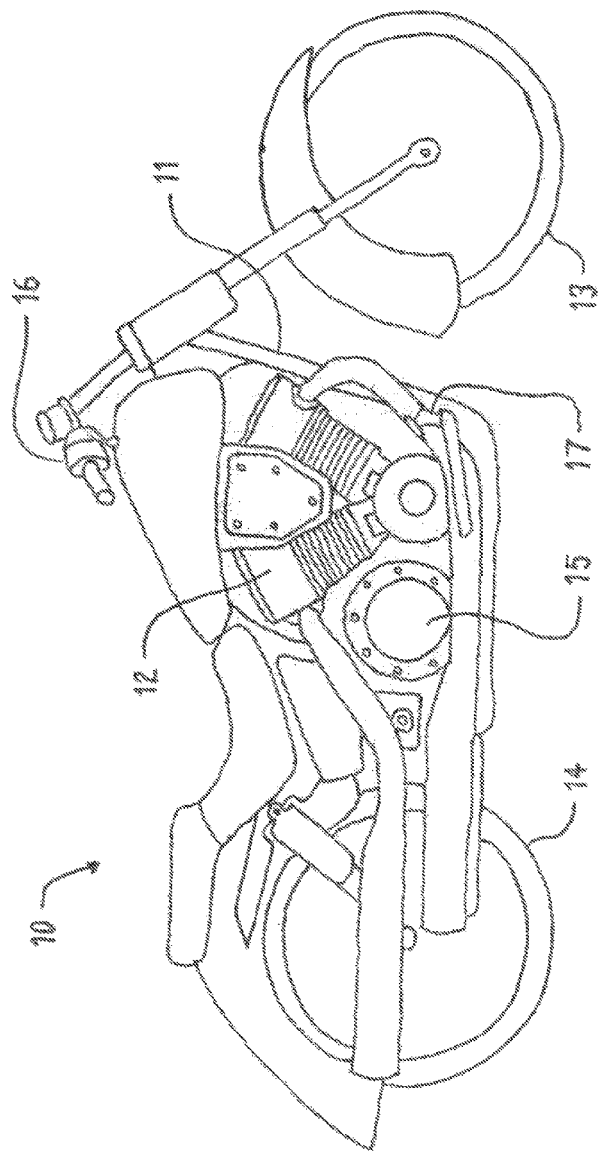
FIG. 1 is a right side elevation view of a prior art motorcycle.

This invention has three aspects: an improved motorcycle, an improved retrofit rear brake assist system for a motorcycle, and an improved method for converting a standard foot-operated rear brake system of a motorcycle to a hand-operated rear brake assist system. All three aspects are based on modifications that are made to a standard motorcycle 10 as shown in FIG. 1. Many minor components of the motorcycle are omitted for clarity. The motorcycle has a frame 11, an engine 12 mounted in the frame, a steering front wheel 13 connected to the frame, a drive rear wheel 14 connected to the frame, a transmission 15 connecting the engine to the rear wheel, a handlebar 16 connected to the front wheel, and a rear brake system 17. The rear brake system includes a rear brake foot rest connected to the frame, a rear brake foot pedal, a rear brake connected to the rear wheel, and a hydraulic or mechanical connection between the rear brake foot pedal and the rear brake. The force with which the foot pedal is depressed determines the force with which the rear brake is applied.

Figure 2:
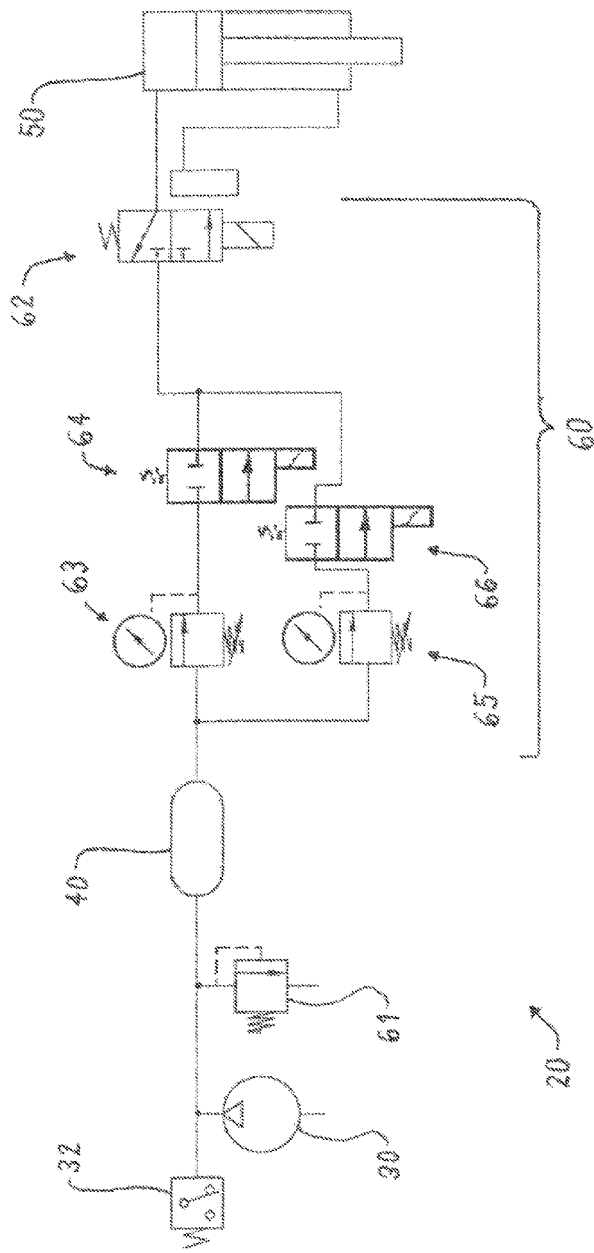
FIG. 2 is a schematic diagram of the motorcycle brake assist system of this invention showing pneumatic components.
Figure 3:
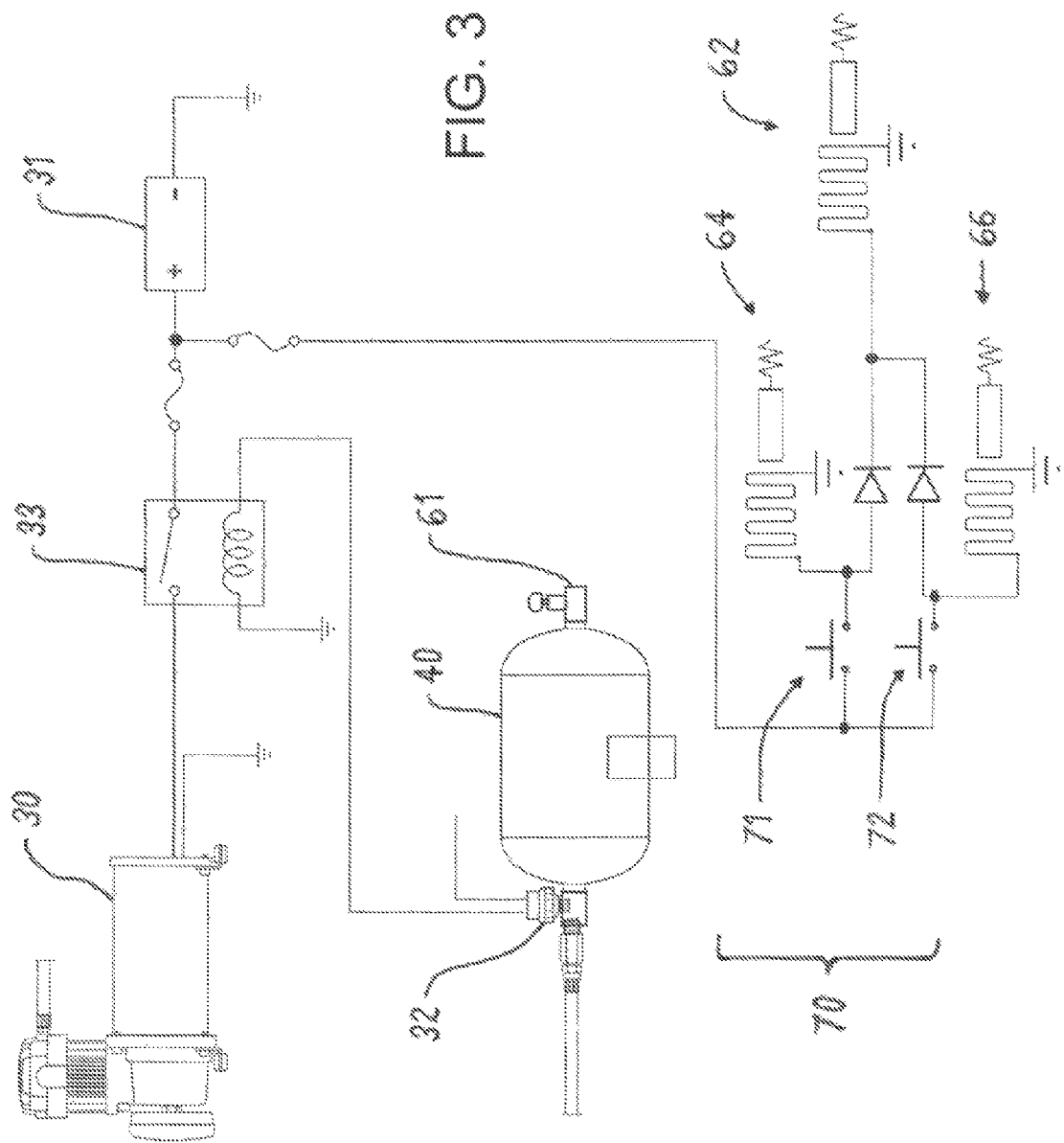
FIG. 3 is a schematic diagram thereof showing electrical components.

The modifications of this invention do not alter the rear brake system of the motorcycle. Instead, the modifications change only the way the rear brake pedal is depressed. Rather than being depressed by the operator's right foot, the rear brake pedal is depressed by a pneumatic cylinder that is controlled by a hand-operated switch. The motorcycle rear brake assist system of this invention 20 has five primary pneumatic and electrical components: (1) an air compressor 30; (2) an air tank 40; (3) a pneumatic cylinder 50; (4) a valve system 60; and (5) an electrical control system 70. A schematic diagram of the rear brake assist system with detail on the pneumatic components is shown in FIG. 2. A schematic diagram of the rear brake assist system with detail on the electrical components is shown in FIG. 3. Each of the primary components is discussed in turn.

2. The Air Compressor

The air compressor 30 provides the compressed air that operates the pneumatic cylinder. The air compressor is preferably powered by the battery 31 of the motorcycle. The air compressor turns on whenever the air pressure in the air tank drops to designated level as controlled by a pressure switch 32. It operates only when the ignition switch/relay 33 is turned on. The air compressor is conventional. A preferred air compressor is a model 100C compressor sold by VIAIR Corporation of Irvine, Calif. This air compressor is rated at 130 pounds per square inch gauge (psig). In the preferred embodiment, the air compressor is mounted in an enclosure located along a side of the rear wheel.

3. The Air Tank

The air tank 40 stores compressed air so that the air needed to operate the pneumatic cylinder is instantly available. The air tank is conventional. A preferred air tank is a model 91005 tank sold by VIAIR Corporation of Irvine, Calif. This air tank is rated at 150 pounds per square inch gauge (psig) and has a capacity of one-half gallon. In the preferred embodiment, the air tank is mounted in an enclosure located along same side of the rear wheel as the air compressor.

4. The Pneumatic Cylinder

The pneumatic cylinder 50 provides the mechanical force that depresses the rear brake pedal. The term "pneumatic cylinder" is used to refer to the entire apparatus including the cylindrical enclosure and the reciprocating piston. The pneumatic cylinder is preferably a conventional double-acting cylinder (i.e., a force is required to extend the piston and a force is also required to retract the piston). Compressed air from the air tank provides the force to extend the piston. When the pneumatic cylinder is vented to the atmosphere, the return biasing spring of the rear brake foot pedal provides the force to retract the piston.

The pneumatic cylinder is positioned in close proximity to the rear brake foot pedal so that the pedal is depressed when the piston is in the extended position and the pedal is released when the piston is in the retracted position. The pneumatic cylinder can be oriented vertically with its piston pointed downward as shown in FIG. 5 or can be oriented horizontally with the piston pointed as shown in FIG. 6. A preferred pneumatic cylinder is a NITRA model A20030DD cylinder sold by Automation Direct, Inc. of Cumming, Ga. This pneumatic cylinder has a three inch stroke and is rated at a maximum pressure of 250 pounds force per square inch gauge (psig).

5. The Valve System

The valve system 60 controls the flow of compressed air from the air compressor to the pneumatic cylinder. The valve system includes a pressure relief valve 61 in the line between the air compressor and the air tank. The pressure relief valve is a safety measure that releases air if the pressure in the tank exceeds a certain level. The valve system also includes at least one pressure regulator and a three-way solenoid valve 62 in a line between the air tank and the pneumatic cylinder. The pressure regulator reduces the pressure as desired. The pressure regulator is preferably adjustable with a knob so the operator can easily set the pressure to the pneumatic cylinder which, in turn, determines the force applied to the rear brake.

As the name implies, the three-way solenoid valve has connections for three air lines. The valve has two positions: (1) an actuated position that allows the flow of compressed air to the pneumatic cylinder; (2) a unactuated position that prevents the flow of compressed air to the pneumatic cylinder and that allows air in the pneumatic cylinder to vent to the atmosphere. Three-way solenoid valves are articles of commerce.

In the preferred embodiment shown in FIG. 2, two parallel lines run in a section between the air tank and the three-way solenoid valve. The parallel lines join upstream of the three-way solenoid valve so that only a single three-way solenoid valve is needed. The first parallel line includes a first pressure regulator 63 and a first two-way solenoid valve 64. The second parallel line includes a second pressure regulator 65 and a second two-way solenoid valve 66. The two lines enable two different pressures to be applied to the pneumatic cylinder and, as a result, two different forces to be applied to the rear brake pedal. The first pressure regulator is generally set at about 10 to 15 psig for routine stopping while the second pressure regulator is generally set at about 20 to 40 psig for emergency stopping. The preferred pressures are set by the operator and depend on the geometry of the pneumatic cylinder and brake pedal and on personal preference for braking forces.

6. The Control System

The electrical control system 70 controls the air compressor and the solenoid valve(s). As previously mentioned, the air compressor is powered by the motorcycle battery 31 and is controlled by a pressure switch 32 that communicates with the air tank. When the pressure in the air tank diminishes to a lower set point, the pressure switch activates the air compressor. When the pressure in the air tank reaches an upper set point, the pressure switch deactivates the air compressor. As previously mentioned, the pressure switch operates only when the motorcycle ignition switch 33 is on.

Figure 4:
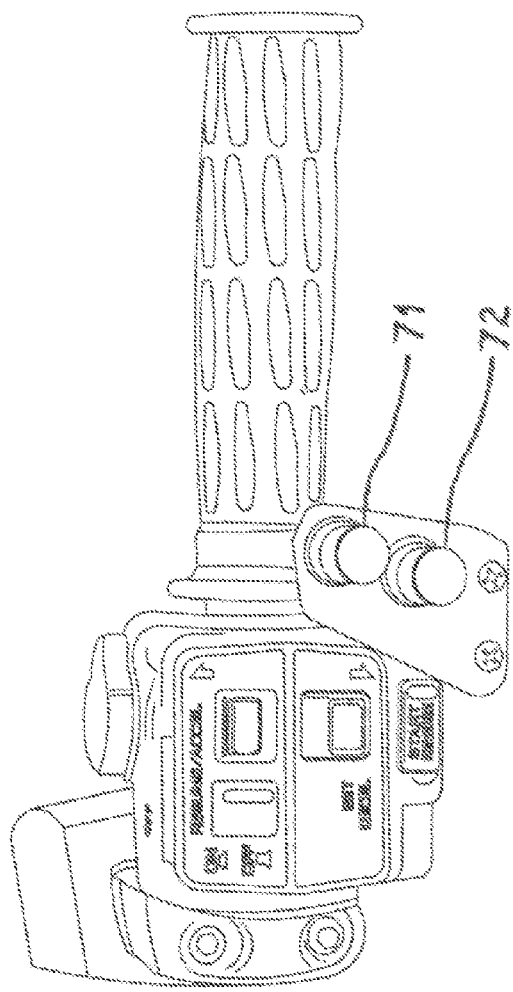
FIG. 4 is a perspective view of the handlebar controls thereof.

Each solenoid valve is controlled by a switch mounted on the handlebar. The switch is preferably a button that can be operated by the right thumb. In the preferred embodiment having two parallel air lines, a first button switch 71 controls first solenoid valve 64 and a second button switch 72 controls second solenoid valve 66. The three-way solenoid valve 62 is energized when either of the two-way solenoid valves is energized. The button switches are shown mounted on the right side of the handlebar adjacent the cruise controls in FIG. 4.

7. Installation and Removal

The rear brake assist system is installed by mounting the pneumatic cylinder in the desired position adjacent the rear brake foot pedal, mounting the air compressor and tank in desired positions, mounting the hand-operated switch(es) in the desired position on the handlebar, running the air lines with the desired valves and regulators, and making the electrical connections. Two typical installations of the pneumatic cylinder are shown in FIGS. 5 and 6. In FIG. 5, the motorcycle contains a heel rest 17a for the right foot and, in FIG. 6, the motorcycle contains a floorboard-type foot rest 17b for the right foot. In FIG. 5, the pneumatic cylinder 50 is mounted vertically above the rear brake pedal 17c. More particularly, the end of the pneumatic cylinder opposite the piston is mounted to a bracket 51 that is, in turn, mounted to the frame of the motorcycle. The piston of the pneumatic cylinder is attached to the rear brake pedal with a pin that passes through a hole drilled through the lever arm of the rear brake pedal.

In FIG. 6, the pneumatic cylinder is mounted horizontally below the rear brake pedal. More particularly, the end of the pneumatic cylinder opposite the piston is mounted to a bracket 52 that is, in turn, mounted to the frame of the motorcycle. The piston is linked to the rear brake pedal by a bracket 53. The bracket is attached to the rear brake pedal with two bolts that pass through holes drilled through the lever arm of the rear brake pedal. The rear brake assist system is removed by reversing the steps.

8. Operation

The operation of the rear brake assist system can now be considered. In the one button embodiment, the operator of the motorcycle depresses the handlebar-mounted button with his right thumb to activate the rear brake. Depressing the button opens the three-way solenoid valve which, in turn, allows compressed air to flow to the pneumatic cylinder. This, in turn, causes the piston to extend and depress the rear brake foot pedal. When the thumb is released, the three-way solenoid valve closes, the pneumatic cylinder is allowed to vent to the atmosphere, and the rear brake foot pedal moves upward and pushes the piston back into the cylinder.

In the preferred two button embodiment, the operation is similar except the operator can choose to activate the rear brake with moderate or extreme force by his choice of button to depress. The operator's choice of button determines which two-way solenoid valve opens. As previously discussed, the three-way solenoid valve opens regardless of which button is depressed.

9. Features and Advantages

The rear brake assist system of this invention enables a person without a functioning right foot to operate a standard motorcycle. The operator activates the rear brake by depressing a switch on the handlebar with the right hand. The standard foot-operated rear brake system remains intact. Accordingly, the restoration of the motorcycle to normal operation for use by a person with a functioning right foot is inexpensive and easy.

I claim:

1. A method for converting a standard foot-operated rear brake system of a motorcycle with an engine and a handlebar to a hand-operated rear-brake assist system, the method comprising:
    (a) mounting an air compressor on the motorcycle to produce compressed air;
    (b) mounting an air tank on the motorcycle for receiving and storing the compressed air from the air compressor;
    (c) mounting a pneumatic cylinder on the motorcycle in communication with the air tank, the pneumatic cylinder being mounted on a frame of the motorcycle in close proximity to a rear brake foot pedal of the motorcycle such that when pressurized, a piston of the pneumatic cylinder extends to depress the rear brake foot pedal and thereby apply a rear brake, and when depressurized, the piston retracts to allow the rear brake foot pedal to move upward to release the rear brake;
    (d) mounting a valve means on the motorcycle for controlling air flow between the air tank and the pneumatic cylinder; and
    (e) mounting a control means on the motorcycle for controlling the valve means, the control means including a switch mounted on the handlebar;
wherein activating the switch on the handlebar causes the valve means to open, the pneumatic cylinder to be pressurized, the piston to extend, the rear brake foot pedal to be depressed, and the rear brake to be applied.

2. The method of claim 1 wherein an air line is installed between the air tank and the pneumatic cylinder and wherein the air line contains a three-way solenoid valve.

3. The method of claim 2 wherein two parallel air lines are installed in a section of the air line between the air tank and the pneumatic cylinder, each parallel air line having a two-way solenoid valve controlled by the handlebar-mounted switch.

4. The method of claim 3 wherein each of the two parallel air lines contains a pressure regulator, and wherein the pressure regulators are set at different pressures.

5. The method of claim 4 wherein the pneumatic cylinder is mounted substantially vertically.

6. The method of claim 4 wherein the pneumatic cylinder is mounted substantially horizontally.

* * * * *